United States Patent [19]
Brown

[11] Patent Number: 6,099,427
[45] Date of Patent: Aug. 8, 2000

[54] SELF-CLEANING PULLEY DEVICE AND TONER IMAGE REPRODUCTION MACHINE INCLUDING SAME

[75] Inventor: George B. Brown, Fairport, N.Y.

[73] Assignee: Xerox Corporation, Stamford, Conn.

[21] Appl. No.: 09/208,396

[22] Filed: Dec. 9, 1998

[51] Int. Cl.[7] .............................. F16H 55/36; F16H 7/02; B65G 45/14; G03G 21/00
[52] U.S. Cl. .................. 474/188; 474/152; 474/153; 198/498; 399/343; 399/162
[58] Field of Search ..................... 474/152, 153, 474/162, 184, 79, 178, 148, 92, 101, 83, 111–123, 131, 188; 399/162, 149, 327, 343; 198/498, 842

[56] References Cited

U.S. PATENT DOCUMENTS

| | | | |
|---|---|---|---|
| 3,560,305 | 2/1971 | Hints | 156/498 |
| 3,995,487 | 12/1976 | Locke | 474/188 |
| 4,180,155 | 12/1979 | Stevick | 198/498 |
| 4,634,409 | 1/1987 | Johnson et al. | 474/152 |
| 4,878,411 | 11/1989 | Laskowski et al. | 474/178 X |
| 5,213,202 | 5/1993 | Arnold | 198/835 |
| 5,737,669 | 4/1998 | Ring | 399/162 X |
| 5,778,287 | 7/1998 | Yu | 399/167 |
| 5,848,339 | 12/1998 | Costrop et al. | 399/162 X |
| 5,868,730 | 1/1999 | Budnik et al. | 399/162 X |

*Primary Examiner*—Mary Ann Battista
*Assistant Examiner*—Marcus Charles
*Attorney, Agent, or Firm*—Tallam I. Nguti

[57] ABSTRACT

A self-cleaning pulley device includes a cylindrical member including a body portion having an outer surface; a series of spaced apart recesses formed from the outer surface into the body portion, each recess of the series of recesses having a root portion, and the series of recesses defining a series of spaced apart ridges projecting above root portions for engaging corresponding recesses of a belt mounted on the body portion for movement over the cylindrical member. Importantly, the self-cleaning pulley device includes a series of dirt apertures formed at least one within each root portion of each recess for collecting any dirt particles and contamination entering into an area between the body portion of the cylindrical member and a belt mounted thereon, thereby self-cleaning the pulley device, eliminating noise and preventing functional inefficiencies in a belt and pulley assembly using the pulley device.

5 Claims, 3 Drawing Sheets

SELF-CLEANING PULLEY DEVICE AND TONER IMAGE REPRODUCTION MACHINE INCLUDING SAME

BACKGROUND

This invention relates to belt powered machines, and more particularly to an electrostatographic toner image reproduction machine including a self-cleaning pulley device for reducing and minimizing contamination related problems in what is a contamination-proned environment.

Generally, the process of electrostatographic reproduction, as practiced in electrostatographic reproduction machines, includes charging a photoconductive member to a substantially uniform potential so as to sensitize the surface thereof. A charged portion of the photoconductive surface is exposed at an exposure station to a light image of an original document to be reproduced. Typically, an original document to be reproduced is placed in registration, either manually or by means of an automatic document handler, on a platen for such exposure.

Exposing an image of an original document as such at the exposure station, records an electrostatic latent image of the original image onto the photoconductive member. The recorded latent image is subsequently developed using a development apparatus by bringing a charged dry or liquid developer material into contact with the latent image. Two component and single component developer materials, particularly dry developer materials, are commonly used. A typical two-component dry developer material has magnetic carrier granules with fusible toner particles adhering triboelectrically thereto. A single component dry developer material typically comprising toner particles only can also be used. The toner image formed by such development is subsequently transferred at a transfer station onto a copy sheet fed to such transfer station, and on which the toner particles image is then heated and permanently fused so as to form a "hardcopy" of the original image.

The use of dry developer materials in electrostatographic toner image reproduction machines, obviously results in particularly toner particles from such materials becoming airborne inside and around the machines. It has been found that such airborne particles or contaminants are detrimental to the proper functioning of belt and pulley assemblies such as timing belt assemblies. For example, timing belt "jumping" has been identified as the primary field problem for a number of such machines. Normally, the airborne powdered material or toner particles settle on surfaces within the machine, including moving surfaces of moving belts that ride over pulleys. The belt surfaces thus move the particles onto the pulleys, where if not removed, the particles accumulate, and are then undesirably compacted thereon by the belt. In timing belt and pulley assemblies where precision is very important, such compacted build ups cause the belt to jump upon contact, thus resulting in improper functioning of the assembly.

SUMMARY OF THE INVENTION

In accordance with the present invention, there is provided a self-cleaning pulley device for preventing improper pulley functioning in a contamination-proned machine environment. The self-cleaning pulley device comprises a cylindrical member including a body portion having an outer surface; a series of spaced apart recesses formed from the outer surface into the body portion, each recess of the series of recesses having a root portion, and the series of recesses defining a series of spaced apart ridges projecting above root portions of the series of recesses for engaging corresponding recesses of a belt mounted on the body portion for movement over the cylindrical member. The self-cleaning pulley device importantly includes an aperture formed into each root portion of each recess of the series of recesses for collecting any dirt particles and contamination entering into an area between the body portion of the cylindrical member and a belt mounted thereon, thereby self-cleaning the pulley device, eliminating noise, and preventing functional inefficiencies in a belt and pulley assembly using the pulley device.

In accordance with another aspect of the present invention, there is provided in an electrostatographic toner image reproduction machine a belt and pulley assembly for preventing improper pulley functioning in a contamination proned machine environment. The belt and pulley assembly include a drive belt including a top surface, and a bottom surface for riding on a pulley surface. It also includes a self-cleaning pulley device for preventing improper pulley functioning in a contamination-proned machine environment. The self-cleaning pulley device comprises a cylindrical member including a body portion having an outer surface; a series of spaced apart recesses formed from the outer surface into the body portion, each recess of the series of recesses having a root portion, and the series of recesses defining a series of spaced apart ridges projecting above root portions of the series of recesses for engaging corresponding recesses of the belt mounted on the body portion for movement over the cylindrical member. The self-cleaning pulley device importantly includes an aperture formed into each root portion of each recess of the series of recesses for collecting any dirt particles and contamination entering into an area between the body portion of the cylindrical member and the belt mounted thereon, thereby self-cleaning the pulley device, eliminating noise, and preventing functional inefficiencies in the belt and pulley assembly.

BRIEF DESCRIPTION OF THE DRAWINGS

In the detailed description of the invention presented below, reference is made to the drawings, in which.

DETAILED DESCRIPTION OF THE INVENTION

While the present invention will be described in connection with a preferred embodiment thereof, it will be understood that it is not intended to limit the invention to that embodiment. On the contrary, it is intended to cover all alternatives, modifications, and equivalents as may be included within the spirit and scope of the invention as defined by the appended claims.

Figure 1:
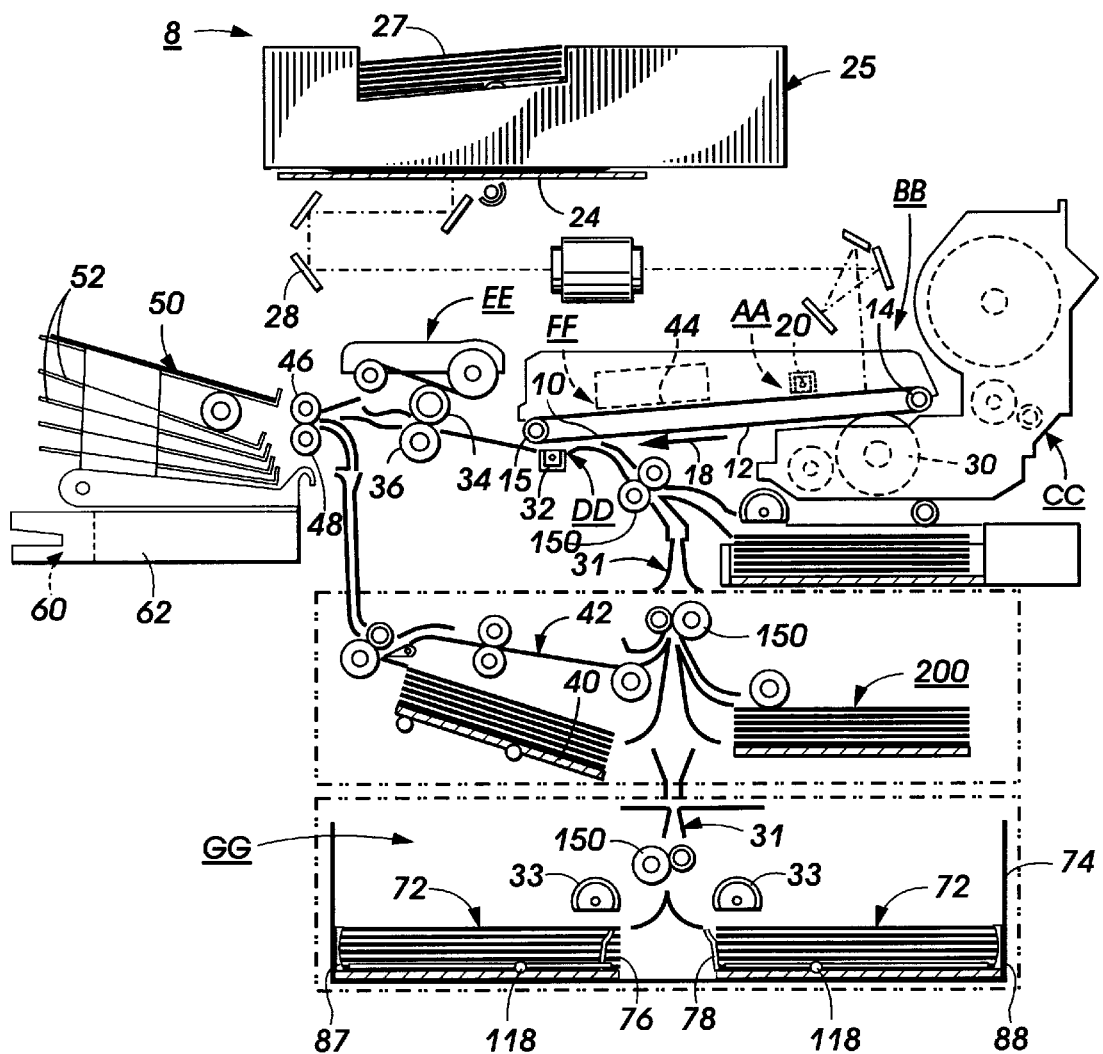
FIG. 1 is a vertical schematic of an exemplary electrostatographic reproduction machine in which a self-cleaning pulley device in accordance with the present invention is useable in a timing belt and pulley assembly.

Referring first to FIG. 1, an exemplary electrostatographic reproduction machine 8 according to the present invention is illustrated. As shown, the machine 8 has conventional imaging processing stations associated therewith, including a charging station M, an imaging/exposing station BB, a development station CC, a transfer station DD, a fusing station EE, and a cleaning station FF. As further shown, the machine 8 includes a sheet supply station shown generally as GG, that includes a non-motorized high capacity cassette tray assembly that includes a conventional snubber type cassette tray assembly shown as 200.

As shown, the machine 8 has a photoconductive belt 10 with a photoconductive layer 12 which is supported by a drive roller 14 and a tension roller 15. The drive roller 14 functions to drive the belt in the direction indicated by arrow 18. The drive roller 14 is itself driven by a motor (not shown) by suitable means, such as a belt drive.

The operation of the machine 8 can be briefly described as follows. Initially, the photoconductive belt 10 is charged at the charging station AA by a corona generating device 20. The charged portion of the belt is then transported by action of the drive roller 14 to the imaging/exposing station BB where a latent image is formed on the belt 10 corresponding to the image on a document positioned on a platen 24 via the light lens imaging system 28 of the imaging/exposing station BB. It will also be understood that the light lens imaging system can easily be changed to an input/output scanning terminal or an output scanning terminal driven by a data input signal to likewise image the belt 10. As is also well known, the document on the platen 24 can be placed there manually, or it can be fed there automatically by an automatic document handler device 25 that includes a multiple document sheet holding tray 27.

The portion of the belt 10 bearing the latent image is then transported to the development station CC where the latent image is developed by electrically charged toner material from a magnetic developer roller 30 of the developer station CC. The developed image on the belt is then transported to the transfer station DD where the toner image is transferred to a copy sheet fed from a sheet cassette tray, for example, from a high capacity sheet cassette tray assembly 70, 72. As shown, the sheets are fed, for example, by a copy sheet handling system 31 that each include a feed roller 33 and a number of belt and pulley assemblies 150, such as timing belt and pulley assemblies, in accordance with the present invention.

At the transfer station DD, a corona generating device 32 is provided for charging the copy sheet so as to attract the charged toner image from the photoconductive belt 10 to the copy sheet. The copy sheet with the transferred image thereon is then directed to the fuser station EE. The fuser apparatus at station EE includes a heated fuser roll 34 and backup pressure roll 36. The heated fuser roll 34 and pressure roll 36 rotatably cooperate to fuse and fix the toner image onto the copy sheet. The copy sheet then, as is well known, may be selectively transported to the finishing area, or to a duplex tray 40 along a selectable duplex path 42 for duplexing.

The portion of the belt 10 from which the developed image was transferred is then advanced to the cleaning station FF where residual toner and charge on the belt are removed by a cleaning device such as a blade 44, and a discharge lamp (not shown) in order to prepare the portion for a subsequent imaging cycle.

When not doing duplex imaging, or at the end of such duplex imaging, the copy sheets upon finally leaving the fusing rolls 34, 36, are passed to finishing area input rolls 46 and 48. From the input rolls 46, 48, the copy sheets are fed, for example, individually to an output tray (not shown) or to a bin sorter apparatus 50 where the sheets can be arranged in a collated unstapled set within the tray or within each bin 52 of the bin sorter apparatus. The bin sorter apparatus 50 can comprise any number of bins 52, which as are well known, can be designed to nest, as well as to indexably cycle past a fixed loading point for sheets. A machine user making such set of copy sheets on the reproduction machine 8 can thus manually remove each such set at a time, and insert a corner or edge of the set into a convenience stapler assembly 60 that is built into a portion 62 of the frame of the machine 8.

The operation of the machine 8 as described above depends significantly on proper timing and synchronization of the movement of many of the components and subassemblies, such as the photoreceptor and copy sheet supplies leading up to the toner image transfer station DD. Proper timing of such movements typically rely on precisely designed timing belt and pulley assemblies. Unfortunately however, because the machine 8 uses dry toner particles for image formation, some such toner particles, as well as other contaminants, become airborne, and undesirably settle on surfaces in areas inside the machine, including areas between timing belts and the timing pulleys on which they are assembled.

As pointed out above, it has been found that such airborne particles or contaminants are detrimental to the proper functioning of belt and pulley assemblies, such as timing belt assemblies. For example, timing belt "jumping" has been identified as the primary field problem for a number of electrostatographic toner image reproduction machines. Normally, the airborne powdered material or toner particles settle on surfaces within the machine, including moving surfaces of moving belts that ride over pulleys. The belt surfaces thus move the particles onto the pulleys, where if not removed, the particles accumulate, and are then undesirably compacted thereon by the belt. In timing belt and pulley assemblies where precision is very important, such compacted build ups cause the belt to jump upon contact, thus resulting in improper functioning of the assembly.

Figure 2:
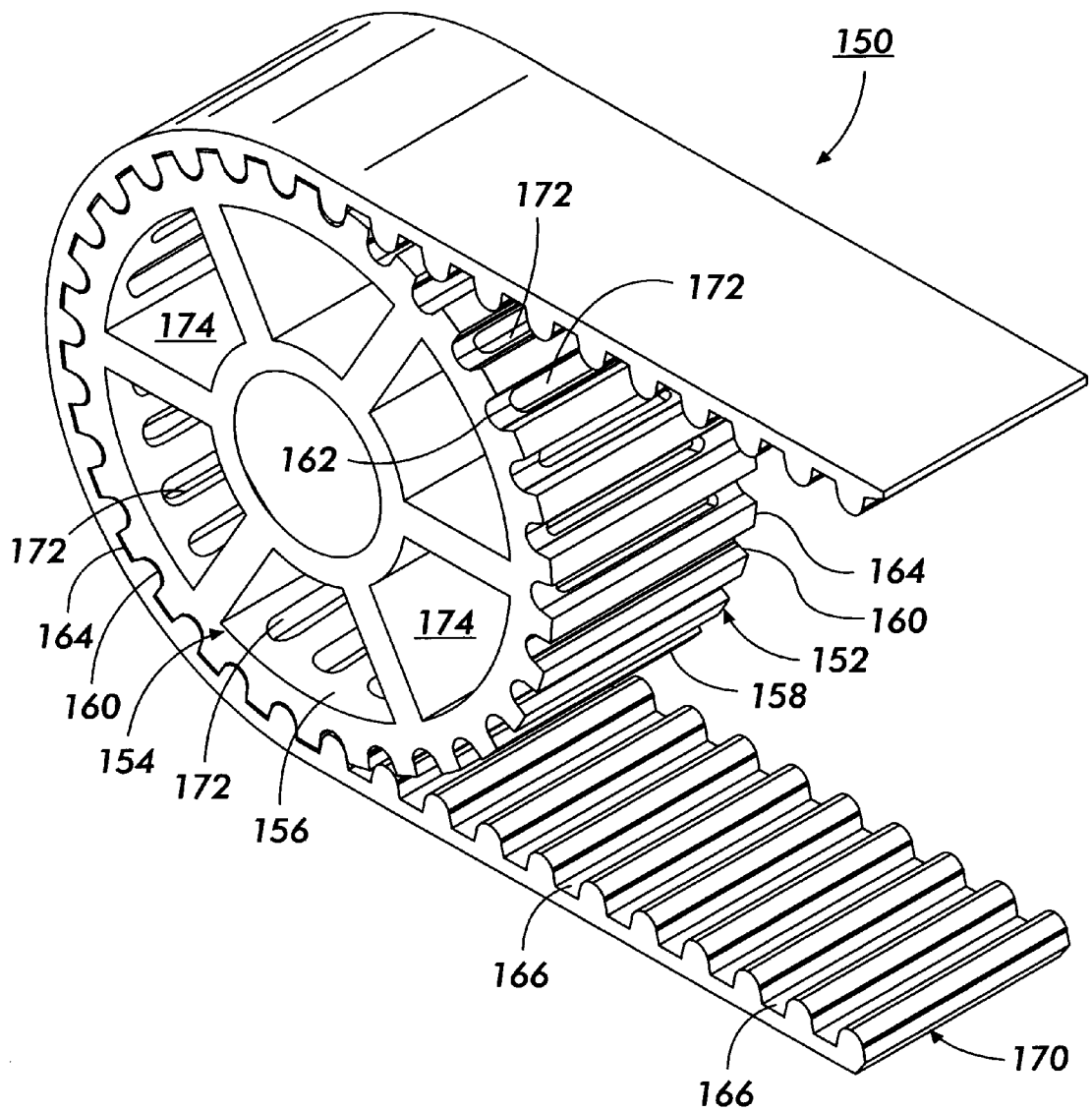
FIG. 2 is a perspective illustration of a timing belt and pulley assembly including the self-cleaning pulley device of the present invention.
Figure 3:
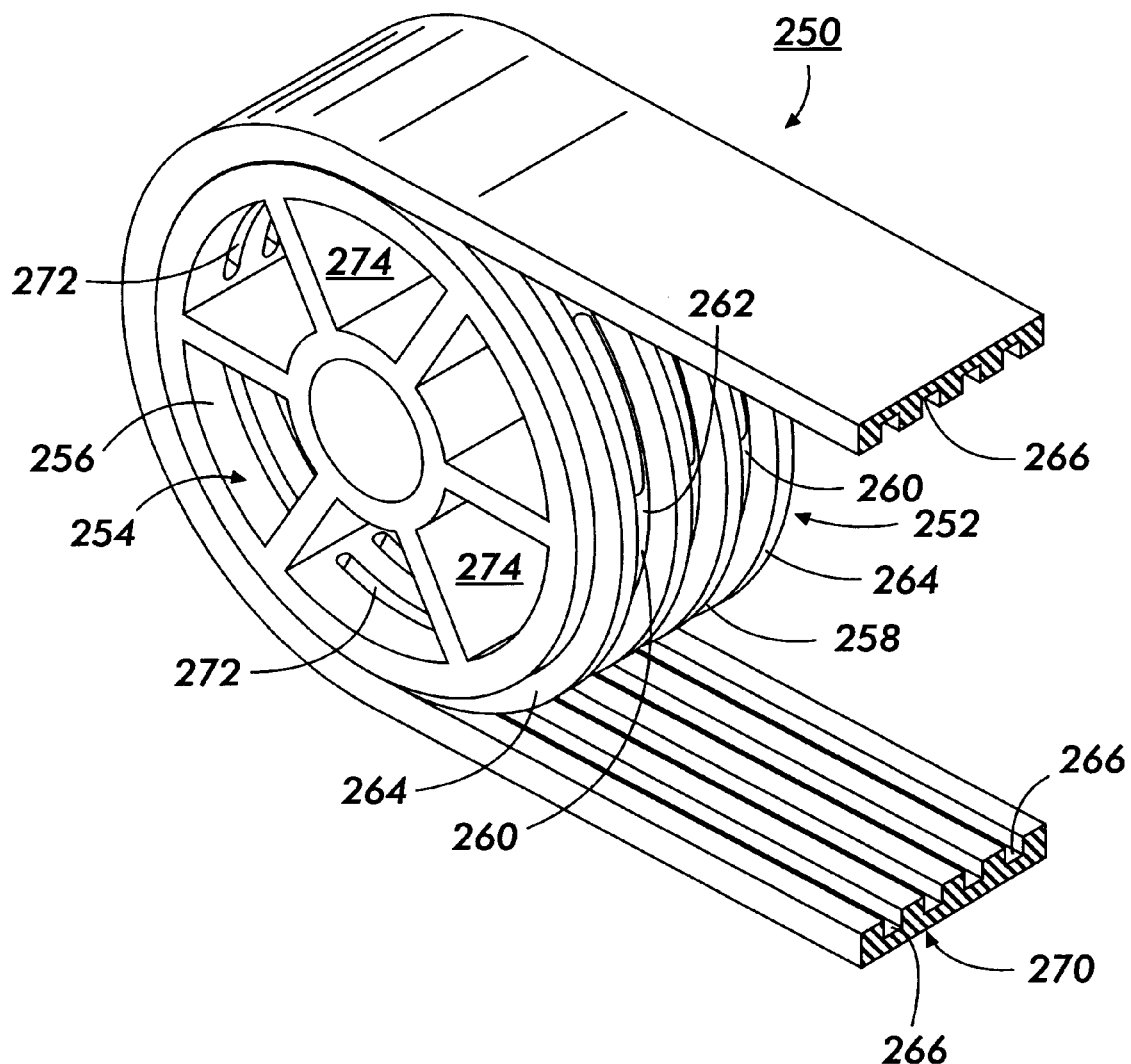
FIG. 3 is a perspective illustration of a belt and sheave assembly including the self-cleaning pulley device of the present invention.

Referring now to FIGS. 2 and 3, first and second embodiments of belt and pulley assemblies 150, 250, respectively are illustrated, each including a self-cleaning pulley device 152, 252 respectively (in accordance with the present invention) for preventing improper pulley functioning in a contamination proned machine environment, such as the airborne-toner environment of the machine 8. As shown FIG. 2, the self-cleaning pulley device 152 comprises a cylindrical member 154 including a body portion 156 having an outer surface 158. The body portion 156 advantageously includes a series of spaced apart recesses 160 formed from the outer surface 158 into the body portion. Each recess 160 of the series of recesses has a root portion 162. The series of recesses defines a series of spaced apart ridges 164 projecting above root portions 162 for engaging corresponding recesses 166 of a belt such as belt 170 mounted on the body portion for movement over such cylindrical member. Importantly in accordance with the present invention, the body portion includes a series of apertures 172 formed at least one into each root portion 162 of each recess 160 for collecting any dirt particles such as airborne toner particles and contamination entering into an area between the body portion 156 of the cylindrical member, and a belt such as belt 170 mounted thereon. As shown clearly in FIG. 2 and claimed in claim 3, the apertures or slots 172 are formed from a root portion 162 through the body portion 156 and into the inner cavity 174 for directing collected dirt and contamination away from the area between the body portion and the belt 170. Collection of dirt particles such as airborne toner particles and contamination as such advantageously enables the self-cleaning the pulley device 152 when used in a belt and pulley assembly such as 150 (FIG. 2), to eliminate noise and prevent functional inefficiencies in such a belt and pulley assembly.

As further shown (FIG. 3), the second embodiment self-cleaning pulley device 252 comprises a cylindrical member 254 including a body portion 256 having an outer surface 258. The body portion 256 advantageously includes a series of spaced apart recesses 260 formed from the outer surface 258 into the body portion. Each recess 260 of the series of recesses has a root portion 262. The series of recesses defines a series of spaced apart ridges 264 projecting above root portions 262 for engaging corresponding recesses 266 of a belt such as belt 270 mounted on the body portion for movement over such cylindrical member. Importantly in accordance with the present invention, the body portion includes a series of apertures 272 formed at least one into each root portion 262 of each recess 260 for collecting any dirt particles such as airborne toner particles and contamination entering into an area between the body portion 256 of the cylindrical member, and a belt such as belt 270 mounted thereon. As shown clearly in FIG. 3 and claimed in claim 3, the apertures or slots 272 are formed from a root portion 262 through the body portion 256 and into the inner cavity 274 for directing collected dirt and contamination away from the area between the body portion and the belt 270. Collection of dirt particles such as airborne toner particles and contamination as such advantageously enables the self-cleaning the pulley device 252 when used in a belt and pulley assembly such as 250 (FIG. 3), to eliminate noise and prevent functional inefficiencies in such a belt and pulley assembly Specifically, when the self-cleaning the pulley device 152, 252 of the present invention is used as the pulley or sheave in a belt and pulley assembly such as 150, 250, the pulley device 152, 252 will rotate together with the drive belt 170, 270, but there will be relative motion between belt and pulley device. The relative motion operates advantageously to push any airborne toner or dirt particles and contaminants caught between the pulley device and belt, into and through the slots or apertures 172, 272. Preferably, the body portion 156, 256 of the cylindrical member includes an inner cavity 174, 274 that may be connected to a gentle vacuum source (not shown) for pulling the collected particles out of the self-cleaning pulley device 152, 252. Advantageously, the dirt particles and contaminants therefore do not build up on the root portions 162, 262 or between the teeth or ridges 164, 264 of the pulley device. Such a build up of course will detrimentally cause the belt to jump, thus losing drive to the pulley or pulley device, resulting in drive noise or miss-timing.

As can be seen, there has been provided a self-cleaning pulley device for preventing improper pulley functioning in a contamination proned machine environment. The self-cleaning pulley device includes a cylindrical member including a body portion having an outer surface; a series of spaced apart recesses formed from the outer surface into the body portion, each recess of the series of recesses having a root portion, and the series of recesses defining a series of spaced apart ridges projecting above root portions for engaging corresponding recesses of a belt mounted on the body portion for movement over the cylindrical member. Importantly, the self-cleaning pulley device includes a series of dirt apertures formed at least one within each root portion of each recess for collecting any dirt particles and contamination entering into an area between the body portion of the cylindrical member and a belt mounted thereon, thereby self-cleaning the pulley device, eliminating noise and preventing functional inefficiencies in a belt and pulley assembly using the pulley device While the embodiment of the present invention disclosed herein is preferred, it will be appreciated from this teaching that various alternative, modifications, variations or improvements therein may be made by those skilled in the art, which are intended to be encompassed by the following claims:

What is being claimed is:

1. A self-cleaning pulley device for preventing improper pulley functioning in a contamination prone machine environment, the self-cleaning pulley device comprising:
    (a) a cylindrical member including a body portion having an outer surface and an inner cavity;
    (b) a series of spaced apart recesses formed from said outer surface into said body portion, each recess of said series of recesses having a root portion, and said series of recesses defining a series of spaced apart ridges projecting above root portions of said series of recesses for engaging corresponding recesses of a belt mounted on said body portion for movement over said cylindrical member; and
    (c) a dirt aperture formed from within each said root portion through said body portion and into said inner cavity for collecting any dirt particles and contamination entering into an area between said body portion of said cylindrical member and a belt mounted thereon, thereby self-cleaning the pulley device, eliminating noise and preventing functional inefficiencies in a belt and pulley assembly using said pulley device.

2. The self-cleaning pulley device of claim 1, wherein said dirt apertures, relative to a longitudinal axis of said cylindrical member, are formed extending longitudinally.

3. The self-cleaning pulley device of claim 2, wherein said dirt apertures are each formed angled downwards from a root portion towards and into said inner cavity for centrifugally forcing collected dirt and contamination away from said root portion.

4. A belt and pulley assembly for preventing improper pulley functioning in a contamination prone machine environment, the belt and pulley assembly comprising:
    (a) a drive belt including a top surface, and a bottom surface for riding on a pulley surface; and
    (b) a cylindrical member including a body portion having an outer surface and an inner cavity;
    (c) a series of spaced apart recesses formed from said outer surface into said body portion, each recess of said series of recesses having a root portion, and said series of recesses defining a series of spaced apart ridges projecting above root portions of said series of recesses for engaging corresponding recesses of a belt mounted on said body portion for movement over said cylindrical member; and
    (d) a dirt aperture formed from within each said root portion through said body portion and into said inner cavity for collecting any dirt particles and contamination entering into an area between said body portion of said cylindrical member and a belt mounted thereon, thereby self-cleaning the pulley device, eliminating noise and preventing functional inefficiencies in a belt and pulley assembly using said pulley device.

5. A toner image reproduction machine comprising:
    (a) a movable image bearing member having an imaging surface defining a path of movement;
    (b) electrostatographic elements mounted along said path of movement for forming a toner image on said imaging surface (c) copy sheet feeding means for feeding copy sheets in a timed manner to receive said toner image from said imaging surface, said copy sheet feeding means including a belt and pulley assembly for preventing improper pulley functioning in a contamination prone machine environment, the belt and pulley assembly comprising:

(i) a drive belt including a top surface, and a bottom surface for riding on a pulley surface; and (ii) a cylindrical member including a body portion having an outer surface and an inner cavity;

(iii) a series of spaced apart recesses formed from said outer surface into said body portion, each recess of said series of recesses having a root portion, and said series of recesses defining a series of spaced apart ridges projecting above root portions of said series of recesses for engaging corresponding recesses of a belt mounted on said body portion for movement over said cylindrical member; and (iv) a dirt aperture formed from within each said root portion through said body portion and into said inner cavity for collecting any dirt particles and contamination entering into an area between said body portion of said cylindrical member and a belt mounted thereon, thereby self-cleaning the pulley device, eliminating noise and preventing functional inefficiencies in a belt and pulley assembly using said pulley device.

* * * * *